(12) United States Patent
Sadasivam

(10) Patent No.: US 10,235,279 B2
(45) Date of Patent: Mar. 19, 2019

(54) AUTOMATION TESTING OF GUI FOR NON-STANDARD DISPLAYS

(71) Applicant: HCL Technologies Limited, Chennai (IN)

(72) Inventor: Sivasakthivel Sadasivam, Chennai (IN)

(73) Assignee: HCL TECHNOLOGIES LIMITED, Chennai (IN)

( * ) Notice: Subject to any disclaimer, the term of this patent is extended or adjusted under 35 U.S.C. 154(b) by 959 days.

(21) Appl. No.: 14/318,721

(22) Filed: Jun. 30, 2014

(65) Prior Publication Data

US 2015/0378878 A1    Dec. 31, 2015

(30) Foreign Application Priority Data

Jul. 1, 2013 (IN) ............... 2900/CHE/2013

(51) Int. Cl.
*G06F 11/36* (2006.01)
*G06F 9/44* (2018.01)
*G06F 9/451* (2018.01)
*G06F 8/38* (2018.01)

(52) U.S. Cl.
CPC .......... *G06F 11/3688* (2013.01); *G06F 8/38* (2013.01); *G06F 9/451* (2018.02); *G06F 11/3664* (2013.01); *G06F 11/3692* (2013.01)

(58) Field of Classification Search
CPC ............. G06F 11/3688; G06F 11/3692; G06F 11/263; G06F 11/3664; G06F 11/26; G06F 11/3696; G06F 9/451; G06F 8/38; G06F 17/212; G09G 3/006
See application file for complete search history.

(56) References Cited

U.S. PATENT DOCUMENTS

| | | | | |
|---|---|---|---|---|
| 5,740,352 A | * | 4/1998 | Philipp | G01R 31/28 714/40 |
| 7,213,182 B2 | * | 5/2007 | Kobayashi | G01R 31/31919 714/47.3 |
| 7,318,002 B2 | * | 1/2008 | Kulidjian | G09G 3/006 348/E17.005 |
| 8,749,534 B2 | * | 6/2014 | Man | G09G 3/006 345/204 |
| 2003/0208712 A1 | * | 11/2003 | Louden | H04M 1/72522 714/742 |

* cited by examiner

*Primary Examiner* — Nicholas Ulrich
(74) *Attorney, Agent, or Firm* — Mannava & Kang, P.C.; Vinay Malik

(57) ABSTRACT

The embodiments herein relate to Graphical User Interface (GUI) testing and, more particularly, to automate the testing of GUI for non-standard displays. Initially, an automation module is pre configured with the test cases that are required to test the GUI of the Device Under Test (DUT). Further, the DUT's display is auto configured with an interpretation & reconstruction module which fetches the display parameters and allocates required memory in a memory buffer. Later, the automation module provides the system inputs to DUT in which test cases are executed. Now, the interpretation & reconstruction module interprets and reconstructs the GUI content of DUT by fetching it from its display port. Later, the reconstructed display content will be updated to the memory buffer which is further verified by automation module.

6 Claims, 4 Drawing Sheets

AUTOMATION TESTING OF GUI FOR NON-STANDARD DISPLAYS

TECHNICAL FIELD

The embodiments herein relate to Graphical User Interface (GUI) testing and, more particularly, to automating the testing of GUI for non-standard displays.

BACKGROUND

Basically, display units of any device can be categorized into two types. Some are standard displays which have standard interfaces such as QVGA (Quarter Video Graphics Array), HDMI (High Definition Multimedia Interface), VGA (Video Graphics Array), RGS (Remote Graphics Software) and so on while other are non-standard displays which does not have any standard interfaces. Most of the device testing's happen manually; especially for GUI testing, manual testing is preferred over automation. Further, at present we are having lot of automation tools for testing GUI interfaces of standard displays. But for non standard displays, as there are no standard interfaces it is difficult to test them. Currently, automation testing for GUI is performed with diagnostics software in devices or by manual testing. In manual testing, it involves lot of human intervention and sometimes it is not possible to test each and every function as it consumes more time and effort. Even the other existing processes like capturing display using camera suffers some problems regarding external lightening. Further, the present GUI testing happens by modifying the software present inside the device, in which external commands are sent to capture the GUI through existing communication interface.

What is needed therefore is a system and method which automates the GUI testing for non-standard displays without involving any special algorithm for image processing.

SUMMARY

In view of the foregoing, an embodiment herein provides a system for automating graphical user interface testing in a non-standard display device, the system configured for configuring a display screen of the non standard display device with an interpretation and reconstruction module; executing at least one of a plurality of test cases on the non-standard display device using the interpretation and reconstruction module; interpreting a display content corresponding to the executed at least one test case using the interpretation and reconstruction module; reconstructing the interpreted display content using the interpretation and reconstruction module; and verifying the reconstructed display content using an automation module.

Embodiments further disclose a method for automating graphical user interface testing in a non-standard display device, the method comprises configuring a display screen of the non standard display device with an interpretation and reconstruction module; executing at least one of a plurality of test cases on the non-standard display device using the interpretation and reconstruction module; interpreting a display content corresponding to the executed at least one test case using the interpretation and reconstruction module; reconstructing the interpreted display content using the interpretation and reconstruction module; and verifying the reconstructed display content using an automation module.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION

Figure 1:
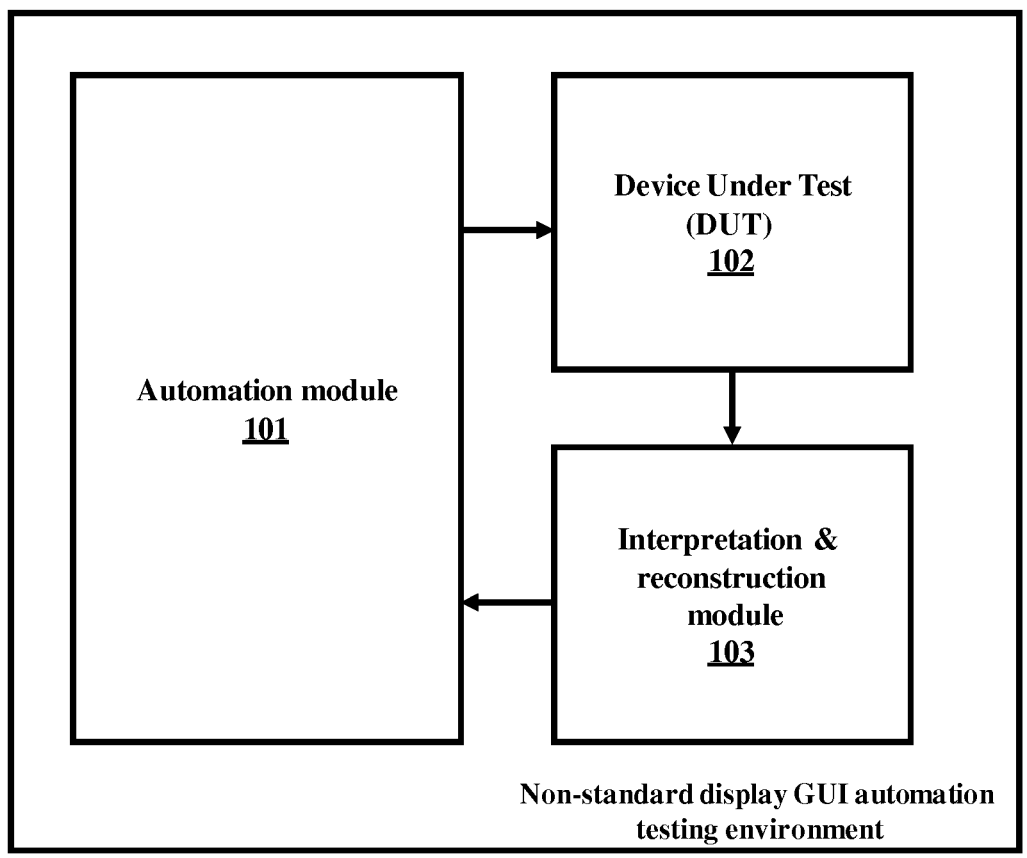
FIG. 1 illustrates a general block diagram of Non-standard display GUI automation testing environment, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system for automation testing of GUI of non-standard display devices by fetching GUI content from Device Under Test (DUT). Referring now to the drawings, and more particularly to FIGS. 1 through 4, where similar reference characters denote corresponding features consistently throughout the figures, there are shown embodiments.

FIG. 1 illustrates a general block diagram of Non-standard display GUI automation testing environment, as disclosed in the embodiments herein. The system consists of an automation module 101, a Device Under Test (DUT) 102 and a Interpretation & reconstruction module 103. The automation module 101 may be any type of commonly available computing device such as PC, tablet and so on which runs on general operating system and is connected to DUT 102 by using any suitable interface. Further, the automation module 101 is pre configured with all the necessary instructions which are required to test the GUI of non-standard display by having test cases defined for each functionality of the DUT. Furthermore, automation module 101 can activate the system inputs and provide them to DUT 102 automatically as per script of the test cases designed. Finally automation module 101 can fetch the output from Interpretation & reconstruction module 103 by using any suitable interface.

The DUT 102 may be any device which is having a non-standard display. Further, DUT 102 fetches the inputs from automation module 101 through any suitable interface depending on the type of DUT 102. For example, let the DUT be a 'calculator', then the keys will be organized from automation module 101 by pressing the required buttons through relay controller and relays. In case of an 'automobile in-vehicle infotainment' system, a CAN controller can be used. The LCD port of DUT 102 is connected to a specially programmed Interpretation & reconstruction module 103 through any suitable interface.

The Interpretation & reconstruction module 103 is a customized programmable hardware which emulates the display interfaces. Further, the Interpretation & reconstruction module 103 is capable of capturing the display content from display port of DUT 102 (i.e., inputs of the display) by using any suitable interface. Furthermore, Interpretation & reconstruction module 103 interprets and reconstructs the display content and finally the reconstructed display content will be sent to automation module 101.

Figure 2:
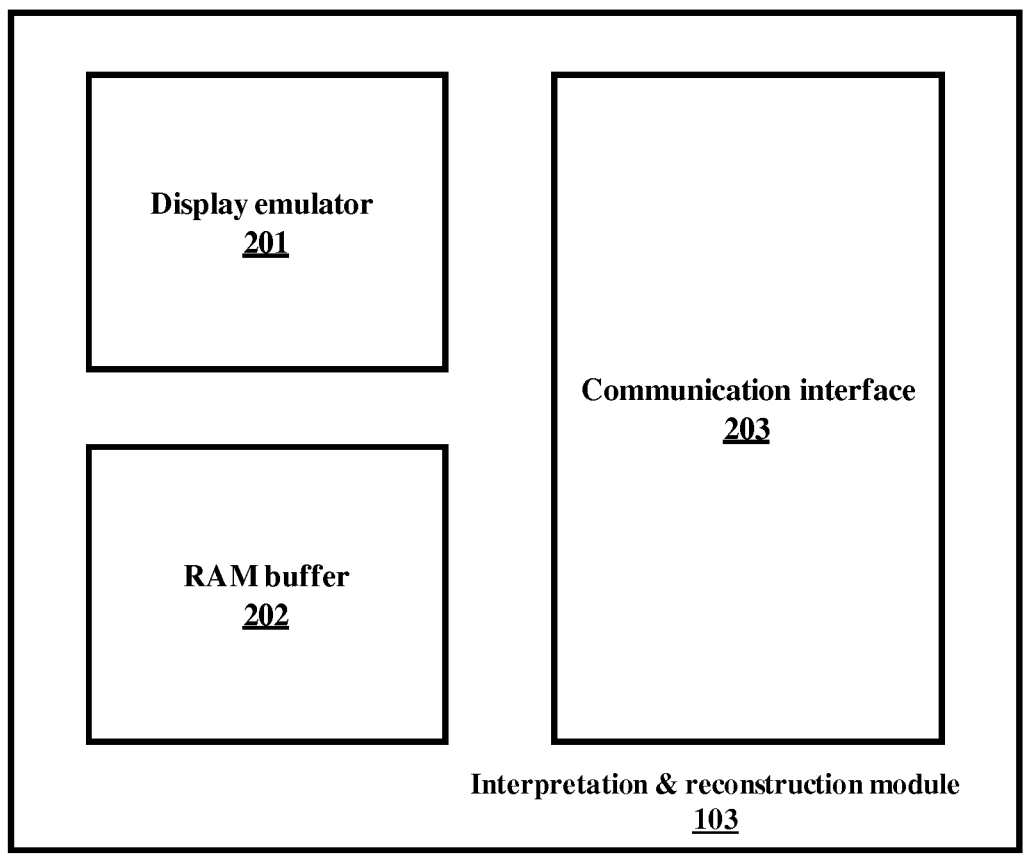
FIG. 2 illustrates a block diagram that shows various components of Interpretation & reconstruction module, as disclosed in the embodiments herein.

FIG. 2 illustrates a block diagram that shows various components of Interpretation & reconstruction module, as disclosed in the embodiments herein. The Interpretation & reconstruction module 103 further consists of a display emulator 201, a RAM buffer 202 and a communication interface 203. The display emulator 201 emulates the display interfaces such as a LCD, LED and so on which can possess non-standard interfaces. Further, the display emulator 201 reads the display content (i.e., display input data) from the display port of the DUT 102 and interprets the display content. Furthermore, the interpreted content will be reconstructed and stores the updated display content in RAM buffer 202. The RAM buffer 202 is a dual buffer Random Accesses Memory which stores the reconstructed display content (images). Further, RAM buffer 202 provides the updated display content to communication interface 203. The communication interface 203 by using a suitable interface sends the reconstructed images to automation module 101.

Figure 3:
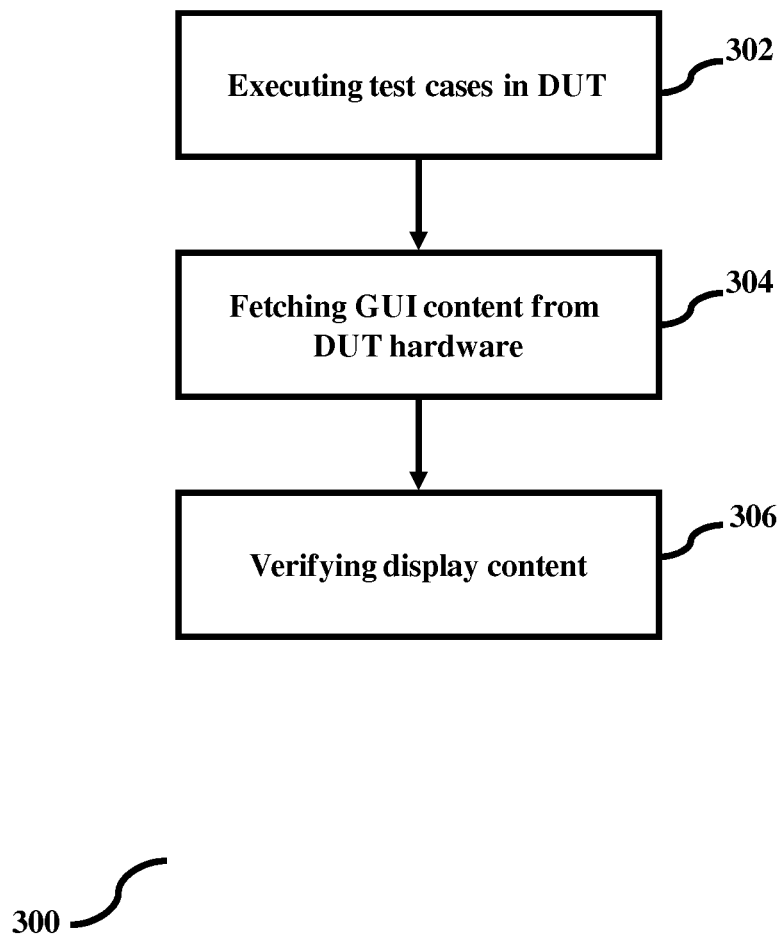
FIG. 3 is a flow diagram which shows various steps involved in the process of automation testing of GUI for non-standard display, as disclosed in the embodiments herein.

FIG. 3 is a flow diagram which shows various steps involved in the process of automation testing of GUI for non-standard display, as disclosed in the embodiments herein. Firstly, the non-standard display device i.e., DUT 102 is connected to the automation module 101 by using any suitable interfaces such as relays, communication based inputs like serial bus, USB, Ethernet, CAN, MOST, LIN and so on depending on the type of the DUT 102. Then the automation module 101 activates the pre configured test cases and provides (302) them to the DUT 102 as system inputs. Now, the DUT 102 fetches the system input data and executes (302) the test cases based on the fetched inputs. Further, corresponding GUI changes will be sent to LCD port for display.

The Interpretation & reconstruction module 103 which is connected to display port fetches (304) these GUI contents from DUT hardware. Further, the fetched GUI content will be send to automation module 101 by using standard protocols such as UDP, TCP/IP through any suitable interface (Ethernet). This involves the process of sending a request from automation module 101 to the Interpretation & reconstruction module 103. Further, the Interpretation & reconstruction module 103 sends an acknowledgement to the request received from automation module 101. Then automation module 101 captures the packets one after another till it receives the command 'packet transmission end' from the Interpretation & reconstruction module 103. After fetching the updated display content, the automation module 101 automatically verifies (306) the captured display content. This can be done by using some standard script engines such as OCR (Optical Character Reader) or image capture algorithms which compare the fetched GUI content with system input that is given to the DUT 102 for that test case. If the fetched output is same as the expected output, the automation module 101 marks the test result as positive which indicates that GUI of the DUT 102 is working properly for that particular function. In other case, if the fetched GUI content is different from the expected output, then the automation module 101 marks the test result for that particular function as negative which indicates that GUI of the DUT 102 is not working properly. The various actions in method 300 may be performed in the order presented, in a different order or simultaneously. Further, in some embodiments, some actions listed in FIG. 3 may be omitted.

Figure 4:
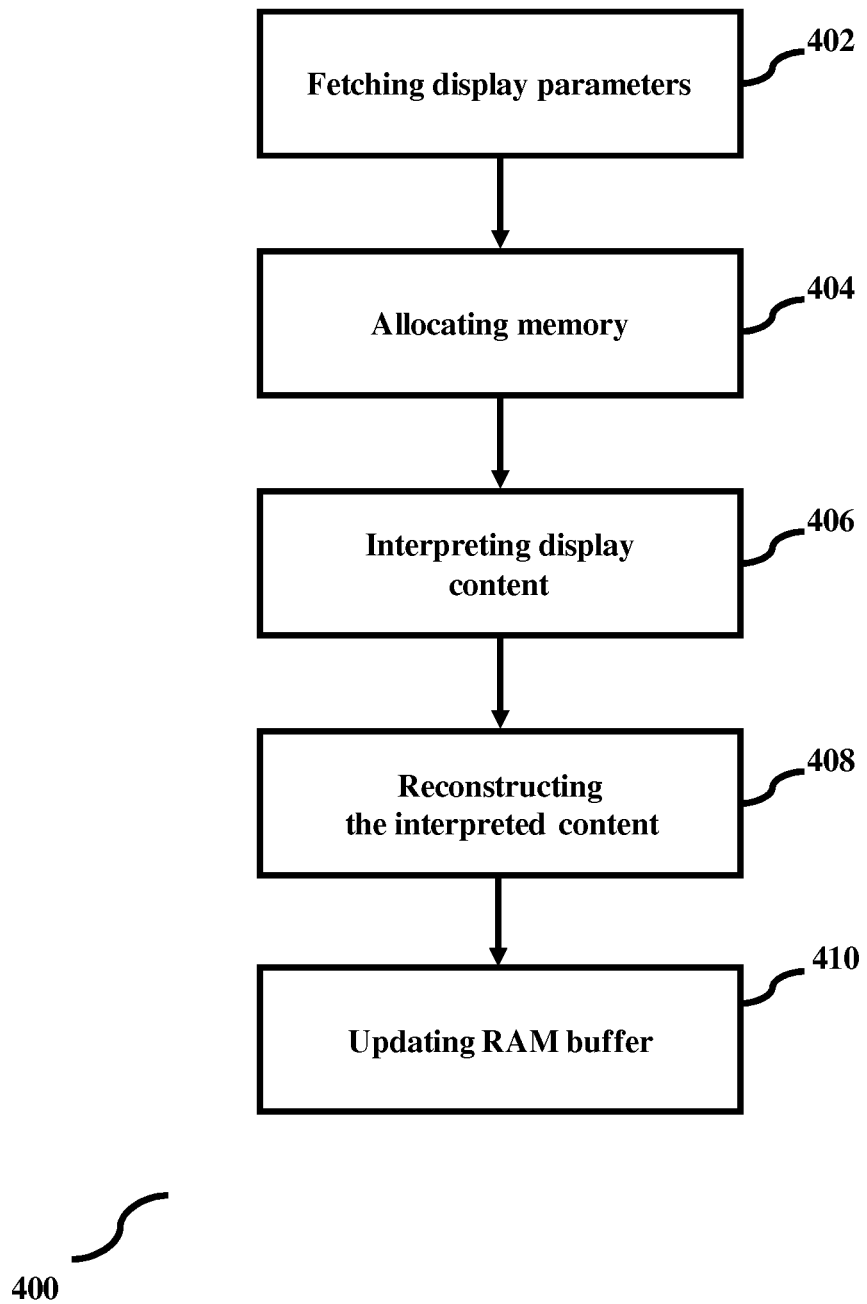
FIG. 4 is a flow diagram which shows various steps involved in the process of fetching GUI content from non-standard display devices, as disclosed in the embodiments herein.

FIG. 4 is a flow diagram which shows various steps involved in the process of fetching GUI content from non-standard display devices, as disclosed in the embodiments herein. Based on the inputs fetched from the automation module 101, corresponding GUI changes will be sent to display port of DUT 102. Firstly, the display port of DUT 102 is auto configured with display emulator 201 by fetching and allocating a required amount of memory for display parameters. Further, the display emulator 201 fetches (402) the details of display parameters like display resolution and color depth from display port of DUT 102 by using a suitable interface. Later depending on the size of resolution, memory is allocated (402) for every pixel in the RAM buffer 202. For example, let us assume that DUT's display resolution is 320×240, 16bit color. Then, memory allocation is done for every pixel i.e., 320×240=76800 words will be allocated in memory. Further, display emulator 201 interprets (406) the display content by reading the details of address and data buses through a suitable interface. Finally the interpreted content will be reconstructed (408) by converting the content to pixel/image format. The reconstructed display content will be updated (410) to double RAM buffer 202 which stores the content temporarily and is transmitted to communication interface 203. Further, the image is converted to packet format by using a suitable communication protocol such as UDP, TCP/IP and so on and transmits over an Ethernet. Finally, the contents of RAM buffer 202 are erased and signal from The Interpretation & reconstruction module 103 is reset. The various actions in method 400 may be performed in the order presented, in a different order or simultaneously. Further, in some embodiments, some actions listed in FIG. 4 may be omitted.

For example, let a 'calculator' (DUT 102) which is having a non-standard display is to be tested. Firstly, the automation module 101 is programmed with all the required test cases to test the functionalities of the calculator. These inputs are provided to the DUT i.e., to the calculator through a relay controller which presses the required buttons automatically. Now, key presses are accepted by the electronic board and display gets updated after processing keys. This updated display content will be fetched by the Interpretation & reconstruction module 103 by reading the address and data bus contents that are connected to LCD port of calculator. Further, the Interpretation & reconstruction module 103 reconstructs the output display image and the image will be sent to automation module 100 which verifies the fetched output image with expected output.

The embodiments disclosed herein can be implemented through at least one software program running on at least one hardware device and performing network management functions to control the network elements. The network elements shown in FIG. 1 to FIG. 2 include blocks which can be at least one of a hardware device, or a combination of hardware device and software module.

The embodiment disclosed herein specifies a system for automatic testing of GUI for non-standard displays. The mechanism allows a customized Interpretation & reconstruction module which captures display content from non-standard display devices providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the embodiments disclosed herein may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A system for automating graphical user interface testing in a Device Under Test (DUT), wherein said Device under Test (DUT) does not comprise of a display module in a test environment, said system comprising:
    an automation module, and an interpretation and reconstruction module, wherein said interpretation and reconstruction module comprises a display emulator, a RAM buffer and a communication interface, wherein said automation module is configured to:
    fetch a plurality of display parameters associated with a display of said Device Under Test (DUT);
    allocate memory in said RAM buffer based on said fetched display parameters, wherein a display port of said Device Under Test (DUT) is configured with said display emulator;
    fetch at least one of a plurality of test cases from the automation module to the Device Under Test (DUT);
    activate at least one system input for said Device under Test (DUT) based on said fetched at least one of said plurality of test cases;
    modify said at least one of said plurality of test cases based on said fetched display parameters;
    execute said modified at least one of a plurality of test cases on said Device Under Test (DUT) based on said activated at least one system input, wherein said plurality of test cases are defined for each functionality of said Device Under Test (DUT);
    interpret a display content corresponding to said executed at least one test case, by reading at least one of a data bus and an address bus from said display port of said Device Under Test (DUT), by said display emulator;
    reconstruct said interpreted display content by said display emulator; and
    verifying said reconstructed display content using at least one of an Optical Character Reader and an image capture, by said automation module;
    determining whether said reconstructed display content is identical to said system input;
    marking said reconstructed display content as positive, if said determined reconstructed display content matches with said system input; and
    marking said reconstructed display content as negative, if said determined reconstructed display content does not match with said system input.

2. The system as claimed in claim 1, wherein said fetched display parameters are at least one of a display resolution and color depth information.

3. The system as claimed in claim 1, wherein said display emulator is configured to reconstruct said display content by converting said display content to pixel format.

4. A method for automating graphical user interface testing in a Device Under Test (DUT), wherein said Device under Test (DUT) does not comprise of a display module in a test environment, said method comprising:
    fetching, by an automation module, a plurality of display parameters associated with display of said Device Under Test (DUT);
    allocating memory in a RAM buffer, by said automation module, based on said fetched display parameters, wherein a display port of said Device Under Test (DUT) is configured with a display emulator;
    fetching, by said automation module, at least one of a plurality of test cases to the Device Under Test (DUT);
    activating, by said automation module, at least one system input for said Device under Test (DUT) based on said fetched at least one of said plurality of test cases;
    modifying, by said automation module, said at least one of said plurality of test cases based on said fetched display parameters;
    executing said modified at least one of a plurality of test cases on said Device Under Test (DUT) based on said activated at least one system input, wherein said plurality of test cases are defined for each functionality of said Device Under Test (DUT);
    interpreting, by said display emulator, a display content corresponding to said executed at least one test case, by reading at least one of a data bus and an address bus from said display port of said Device Under Test (DUT), by said display emulator;
    reconstructing, by said display emulator, said interpreted display content;

verifying said reconstructed display content using at least one of an Optical Character Reader and an image capture, by said automation module;
determining whether said reconstructed display content is identical to said system input;
marking said reconstructed display content as positive, if said determined reconstructed display content matches with said system input; and
marking said reconstructed display content as negative, if said determined reconstructed display content does not match with said system input.

5. The method as claimed in claim 4, wherein said fetched display parameters are at least one of a display resolution and color depth information.

6. The method as claimed in claim 4, wherein said reconstructing interpreted display contents further comprises converting said display content to a pixel format.

* * * * *